Inventor:
John T. Lloyd.
by his Attorneys.
Howson & Howson.

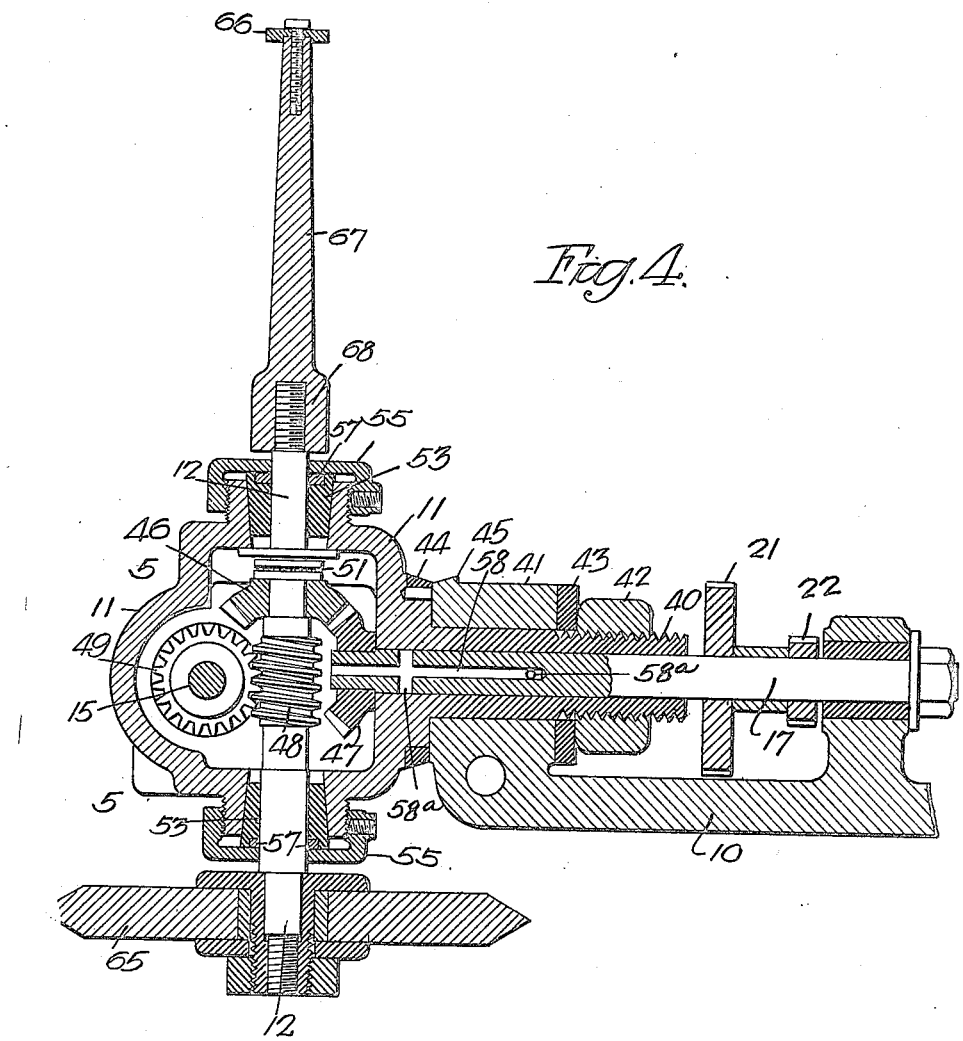

Patented Oct. 31, 1922.

1,434,130

UNITED STATES PATENT OFFICE.

JOHN T. LLOYD, OF PHILADELPHIA, PENNSYLVANIA, ASSIGNOR TO AUTOMATIC MACHINERY AND EQUIPMENT COMPANY, OF PHILADELPHIA, PENNSYLVANIA, A CORPORATION OF DELAWARE.

MILLING AND GRINDING APPARATUS.

Application filed April 6, 1921. Serial No. 458,900.

*To all whom it may concern:*

Be it known that I, JOHN T. LLOYD, a citizen of the United States, residing in Philadelphia, Pennsylvania, have invented certain Improvements in Milling and Grinding Apparatus, of which the following is a specification.

My invention relates to apparatus for milling, grinding, and other operations with rotary tools; and I aim to provide an apparatus of more or less general utility for such operations that shall be especially suited and adapted for the cutting and grinding of screw threads and worms. I aim to make the appliance simple and rugged in construction and convenient and flexible in use; also, to provide for the convenient truing or refinishing of the rotary tools employed in their usual places on the appliance itself.

In the accompanying drawings, Fig. 1 is a side elevation of a milling and grinding apparatus embodying my invention, certain parts being shown in mid-section, and the milling cutter and the grinder being removed;

Fig. 4 is a vertical sectional view through the machine base and the tool head;

Figure 1:
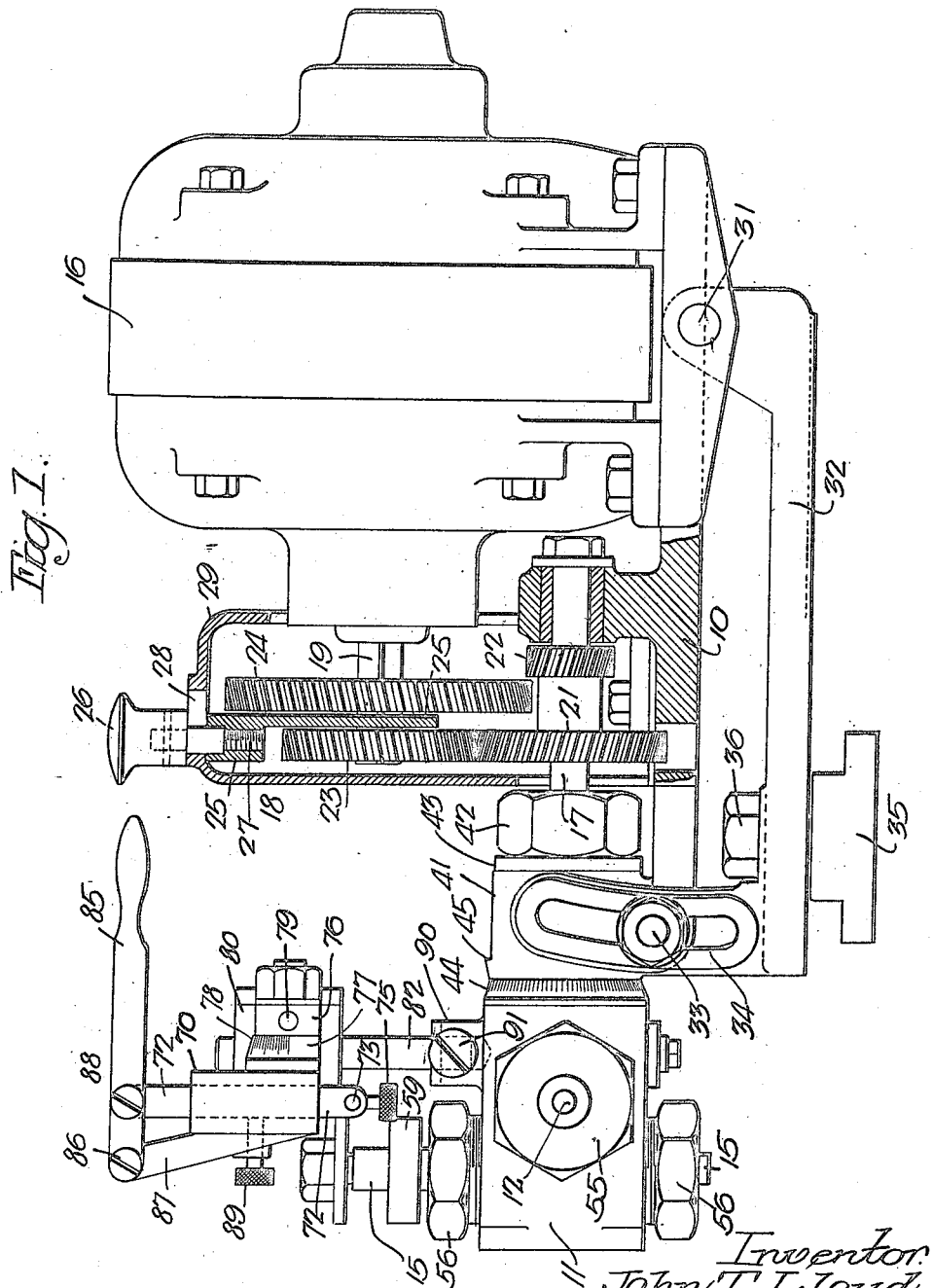
Figure 2:
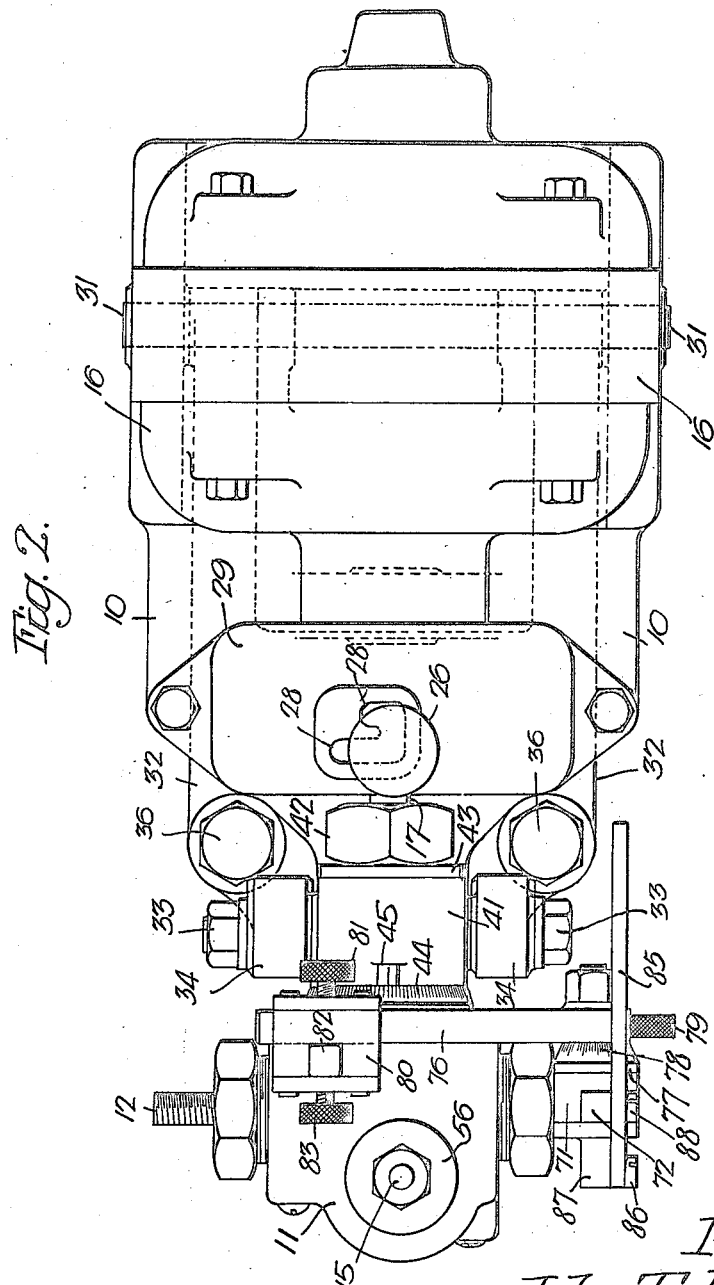
Fig. 2 is a plan view.

Referring first to Figs. 1 and 2, it will be seen that the form of my appliance shown in the drawings comprises a base 10 and a head 11 carried by said base, wherein are mounted rotary shafts or spindles 12 and 15 for rotary milling and grinding tools or the like. On the base 10, is also mounted a motor drive for the shafts 12 and 15, this drive comprising a motor 16, a drive shaft 17 with suitable connections (hereinafter described) to the shafts 12 and 15, and change-speed gearing 18 for connecting the motor shaft 19 with said drive shaft 17. As shown, the change speed gearing 18 comprises suitably spaced helical gears 21 and 22 of different sizes fixed on the drive shaft 17, and corresponding helical gears 23 and 24 appropriately secured together and splined on the motor shaft 19. The latter gears may be shifted lengthwise of the shaft 19 by a shifter 25 so that the gears 23 and 21 may intermesh (as shown), or so that the gears 24 and 22 may intermesh. 26 is a handle having a screw stud 27, which extends through an irregular U-shaped slot 28 in the gear casing and into a threaded opening in the shifter 25. The shifter can be manipulated by this handle and can be clamped to the casing by turning the handle.

The base 10 is pivotally mounted at 31 on a sub-base 32, and can be clamped in position by means of a bolt 33 that extends through the forward end of said base 10 and through slotted lugs 34 that project upward from the sub-base 32 at either side of said forwarded end of the base 10. Provision is made for conveniently mounting the whole appliance in the transverse feedway or cross slide of a screw-cutting lathe,— or on any other desired structure,—by means of a clamp piece 35 secured to the forward end of the sub-base 32 by a pair of clamp-bolts 36.

Figure 3:
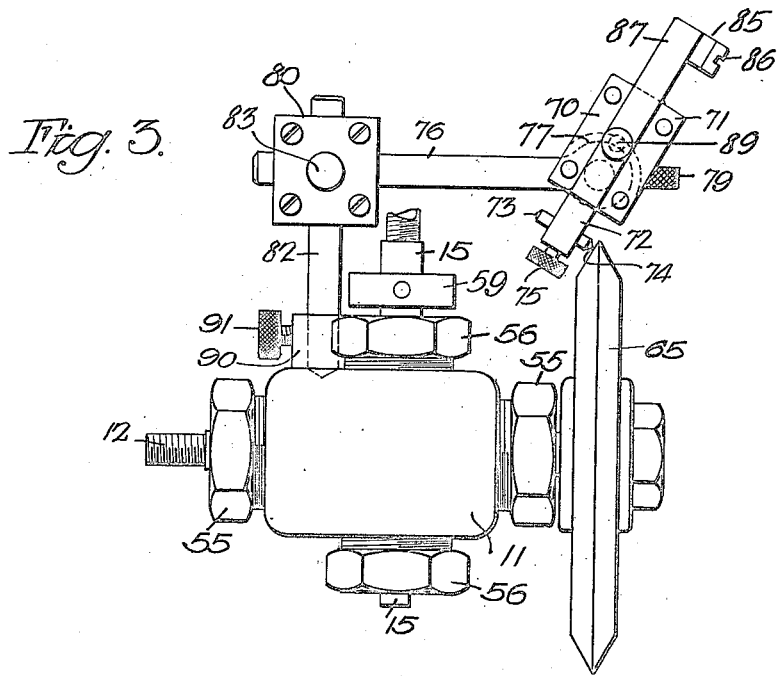
Fig. 3 is an end elevation of the tool head from the left of Figs. 1 and 2, showing the thread-grinder in place and the mechanism for truing or refinishing the thread-grinder adjusted to a position different from that shown in Figs. 1 and 2.

Referring, now, to Figs. 3 and 4 as well as Figs. 1 and 2, it will be seen that the head 11 has a hollow spindle 40 that extends through a bore in a lug 41 on the base 10 and is secured therein by a nut 42 threaded on the end of said spindle,—a washer 43 being interposed between the nut and the lug. The drive 17 extends through the spindle as shown. The pivotal attachment of the head 11 to the base 10 is coaxial, it will be seen, with the drive shaft 17 for the shafts 12 and 15 on the head, and makes the head freely adjustable, angularly, with reference to the base 10 to any position desired. In Fig. 4, the head 11 is shown as turned 90 degrees clockwise (referring to Fig. 3) from its position in Figs. 1, 2 and 3, so as to make the shaft 12 vertical instead of horizontal, and the shaft 15 horizontal instead of vertical. The angular adjustment of the head 11 with reference to the base 10 can be accurately gauged by means such as a ring 44 graduated in degrees fixed on the head 11 adjacent the base 10 and cooperating means such as vernier or index mark on the lug 41,—diagrammatically indicated at 45 in Figs. 1, 2 and 4. When the head 11 has been brought to any desired angular adjustment, it may be clamped fast and secured by turning the clamping-nut 42.

Figure 5:
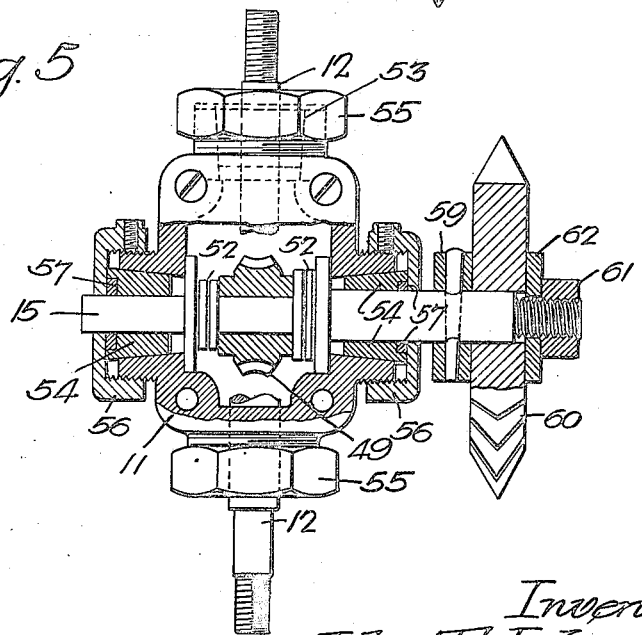
Fig. 5 is a view from the left of Fig. 4, showing the milling cutter in place, various parts being broken away, and others (including the milling cutter) in section on the line 5—5, in Fig. 4.

Referring, now, to Fig. 5 as well as to the other figures, it will be seen that the rotary shafts 12 and 15 extend transversely to one another and to the drive shaft 17; as shown, these three shafts are at right angles to one another. The shaft 12 is driven from the shaft 17 by means of bevelled gears 46 and 47 fixed on the respective shafts, and the shaft 15 is driven from the shaft 12 by means of a worm 48 on the one shaft in mesh with a worm wheel 49 on the other. These driving connections from the shaft 17 to the shafts 12 and 15 are of different ratios, so that the shaft 15 is driven at a different (less) rate of speed than the shaft 12. Also, the driving connections are effective under, and freely permit, any desired angular adjustment of the head 11 with reference to the base 10. The change speed gearing 18, on the other hand, is common to the shafts 12 and 15, and makes it possible to vary their individual speeds as may be required for different kinds of work without affecting their speed ratio as between themselves.

The shafts 12 and 15, it will be seen, have suitable ball bearings 51 and 52 for taking the axial thrust, and extend through conical journal bearings 53 and 54 secured by gland nuts 55 and 56 threaded on projections at opposite sides of the head 11. Each of the conical bearing members 53 and 54 is provided with an annular packing 57 about the corresponding shaft; these packings serve to prevent the escape from the head 11 of lubricant for the various ball and journal bearings and for the gearing,—with which lubricant the head may be filled. Lubrication of the drive shaft 17 in the spindle 40 and in the head 11 is provided for by means of an axial bore 58 in the shaft opening into the interior of the head 11 and a plurality of radial cross-bores 58$^a$ extending from said axial bore to the exterior of the shaft.

Referring to Figs. 1 and 5, it will be seen that the upper end of the shaft 15 (Figs. 1 and 3) has keyed thereto a collar 59 which forms a shoulder against which a milling cutter 60 may be secured, by means of a clamp nut 61 and an interposed washer 62. The ends of the shaft 12 are appropriately shouldered and threaded (as shown in Figs. 4 and 5) for the attachment of other rotary tools, such as a screw cutting emery wheel 65 shown in Figs. 3 and 4, and a smaller emery wheel 66 for internal grinding, which is secured on the end of a taper spindle 67, having an internally threaded socket 68 at its lower end for screwing on the shaft 12.

Referring, now, to Figs. 1, 2 and 3, it will be seen that a tool dressing or refinishing appliance 70 is mounted on the head 11. This appliance 70 comprises a slideway 71 for the dresser or refinisher 72,—here shown as a bar with a cross-rod mounting 73 (for a bort or diamond 74) clamped in its end by means of a set-screw 75. Provision is made for angular adjustment of the slideway 71 with reference to both the shafts 12 and 15 by screw-clamp attachment of the slideway to one end of a horizontal arm 76, in a manner similar to the attachment of the head 11 to the base 10. Similarly, the box 77 on the slideway is provided with a scale 78 graduated in degrees or other angular measure. A knurl-headed set screw 79 threaded into the outer end of the arm 76 serves as aid in preliminarily securing the slideway 71 in adjusted position before tightening up the clamp-bolt. The arm extends through a close-fitting opening in a clamping head 80, and can be secured in any desired position therein by means of a set-screw 81. The head 80 is mounted in a similar manner on an upright standard 82, and can be secured in any desired position thereon by means of a set screw 83. By these means, the slideway can be adjusted both longitudinally and transversely or radially with reference to either of the shafts 12 and 15, to adapt the refinishing appliance 70 to operate on a tool in its usual place on one of these shafts. When the appliance 70 is properly adjusted, the refinisher 72 can be fed through the slideway 71 to refinish the emery wheel (for example) to an appropriate screw cutting angle by means of a hand-lever 85 fulcrumed at 86 on a bracket-lug 87, attached to the slideway 71, and having a pivotal connection 88 with the refinisher 72. If desired, the refinisher 72 can be set in a fixed position in the slideway 71 by a set screw 89. The refinishing device 70, it will be seen, can be shifted from substantially the axial plane of the shaft 12 (as shown in Figs. 1 and 2) to approximately that of the shaft 15 by simply reversing the clamp 80, so as to shift the arm 76 from one side to the other of the standard 82.

The whole refinishing appliance 70 is detachable from the head 11, it will be seen, by virtue of the fact that the lower end of the standard 82 is removably secured in a close fitting socket 90 on the head by means of a set screw 91.

The mode of using my apparatus and its convenience will be apparent from the foregoing description. Screw threads may first be cut by means of the milling cutter 60; then the head 11 may be shifted 90 degrees to bring the emery wheel 65 into proper operating position, and the thread properly ground and finished by means of the emery wheel. The change-speed gearing 18 may be used either to adapt the appliance to work on pieces of different sizes or to secure a very much higher speed of the emery wheel than that used in milling operations. The small emery wheel 66 affords convenient means for interior grinding, and may be brought to any desired position by turning the head 11. The tilting adjustment of the base 10 enables the apparatus to be readily adjusted to lathes of different sizes.

I claim:

1. An apparatus for milling, grinding, and the like, comprising a tiltingly adjustable base, a head with a shaft for a rotary tool carried by said base and angularly adjustable with reference thereto; and a driving motor mounted on said base with connection to the shaft effective under and freely permitting any angular adjustment of said head with reference to said base.

2. An apparatus for milling, grinding and the like, comprising a base; a head with shafts for rotary tools at right angles to one another carried by said base and angularly adjusted with reference thereto; and a driving motor mounted on said base with connection to the shafts effective under and permitting any angular adjustment of said head with reference to said base.

3. An apparatus for milling, grinding, and the like, comprising a base, and a head with a plurality of rotary shafts for milling and grinding tools carried by said base and angularly adjustable with reference thereto; and a driving motor for said shafts mounted on said base with connections to the shafts driving them at different speeds.

4. An apparatus for milling, grinding, and the like, comprising a base, and a head with a plurality of rotary shafts for milling and grinding tools carried by said base and angularly adjustable with reference thereto; and a motor drive for said shafts mounted on said base, and including driving connections of different ratios to different shafts and change-speed gearing common to them.

5. An apparatus for milling, grinding. and the like, comprising a base; a head carried by said base angularly adjustable with reference thereto, and itself carrying a plurality of rotary shafts for milling and grinding tools extending transversely to one another and to the axis of adjustment of the head; and a driving motor mounted on said base with connections of different ratios to different shafts on the head, said connections being effective under and freely permitting angular adjustment of the head with reference to said base.

6. An angularly adjustable head for milling, grinding, and the like apparatus, having a drive shaft coaxial with the axis of adjustment of the head; rotary shafts for milling and grinding tools mounted in the head and extending transversely to one another and to the axis of adjustment of the head; a bevel gear connection from said drive shaft to one of said tool shafts; and a worm and gear connection from the last-mentioned tool shaft to another tool shaft for driving it at a different rate of speed.

JOHN T. LLOYD.